United States Patent
Kamppari et al.

(10) Patent No.: US 9,262,110 B2
(45) Date of Patent: *Feb. 16, 2016

(54) USING A GENERIC EMAIL ADDRESS OF A SERVER AND A SENDER EMAIL ADDRESS TO DETERMINE A DESTINATION PRINTER FOR PRINT DATA

(71) Applicant: Hewlett-Packard Development Company, L.P., Houston, TX (US)

(72) Inventors: Saara Eeva Helena Kamppari, Portland, OR (US); Peter G. Hwang, Vancouver, WA (US); William E. Hertling, Portland, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,299

(22) Filed: Feb. 23, 2015

(65) Prior Publication Data

US 2015/0169262 A1    Jun. 18, 2015

Related U.S. Application Data

(63) Continuation of application No. 13/077,183, filed on Mar. 31, 2011, now Pat. No. 8,970,877.

(51) Int. Cl.
   *G06F 3/12*    (2006.01)

(52) U.S. Cl.
   CPC .............. *G06F 3/126* (2013.01); *G06F 3/1204* (2013.01); *G06F 3/1288* (2013.01); *G06F 3/1291* (2013.01)

(58) Field of Classification Search
   CPC ..... G06F 3/1292; G06F 3/1285; G06F 3/126; G06F 3/1204
   USPC .......................................... 358/1.15
   See application file for complete search history.

(56) References Cited

U.S. PATENT DOCUMENTS

| | | | |
|---|---|---|---|
| 6,337,745 B1 | 1/2002 | Aiello, Jr. et al. |
| 6,552,813 B2 | 4/2003 | Yacoub |
| 6,909,518 B2 | 6/2005 | Miller et al. |
| 6,975,419 B2 | 12/2005 | Staas et al. |
| 7,019,861 B2 | 3/2006 | Aagesen |

(Continued)

FOREIGN PATENT DOCUMENTS

| CN | 101004668 A | 7/2007 |
|---|---|---|
| CN | 101237424 A | 8/2008 |

(Continued)

OTHER PUBLICATIONS

International Search Report & Written Opinion received in PCT Application No. PCT/US2011/025293, Sep. 29, 2011, 9 pages.

(Continued)

*Primary Examiner* — Eric A Rust
(74) *Attorney, Agent, or Firm* — Mahamedi Paradice LLC

(57) ABSTRACT

Example systems and methods provide for maintaining a list of printer associations between user addresses and a set of network printers. A print request directed to a destination email address may be received from a respective user address. Examples provided herein can determine whether one or more of the set of network printers is associated with the respective user address based on the list of printer associations.

14 Claims, 4 Drawing Sheets

(56) References Cited

U.S. PATENT DOCUMENTS

| | | | |
|---|---|---|---|
| 7,079,276 | B2 | 7/2006 | Kimura |
| 7,084,997 | B2 | 8/2006 | Clough |
| 7,088,462 | B2 | 8/2006 | Bhogal et al. |
| 7,096,265 | B2 | 8/2006 | Simpson et al. |
| 7,167,264 | B2 | 1/2007 | Takamiya |
| 7,187,462 | B2 | 3/2007 | Oakeson et al. |
| 7,321,437 | B2 | 1/2008 | Parry |
| 7,441,003 | B1 | 10/2008 | Takeda et al. |
| 7,474,423 | B2 | 1/2009 | Garcia et al. |
| 7,503,636 | B2 | 3/2009 | Ferguson et al. |
| 7,656,547 | B2 | 2/2010 | Kuo et al. |
| 7,760,385 | B2 | 7/2010 | Yamaguchi |
| 7,791,747 | B2 | 9/2010 | Roksz |
| 8,179,549 | B1 | 5/2012 | Evans |
| 2002/0051180 | A1 | 5/2002 | Shimbori et al. |
| 2002/0057449 | A1 | 5/2002 | Chapman et al. |
| 2003/0011801 | A1 | 1/2003 | Simpson et al. |
| 2003/0063309 | A1 | 4/2003 | Parry |
| 2003/0091021 | A1* | 5/2003 | Trossen et al. ............. 370/349 |
| 2003/0107762 | A1 | 6/2003 | Kinoshita et al. |
| 2003/0160977 | A1 | 8/2003 | Nishikawa et al. |
| 2004/0073574 | A1 | 4/2004 | Shimizu et al. |
| 2004/0126165 | A1 | 7/2004 | Carroll |
| 2004/0218201 | A1 | 11/2004 | Lermant et al. |
| 2004/0218213 | A1 | 11/2004 | Shimizu et al. |
| 2005/0270569 | A1 | 12/2005 | Hayashi |
| 2005/0275876 | A1 | 12/2005 | McLean et al. |
| 2006/0158681 | A1 | 7/2006 | Yorimoto et al. |
| 2006/0250631 | A1 | 11/2006 | Igarashi |
| 2006/0250638 | A1 | 11/2006 | Wang et al. |
| 2006/0265473 | A1 | 11/2006 | Muto |
| 2007/0086038 | A1 | 4/2007 | Matsuzaki |
| 2007/0146763 | A1 | 6/2007 | Yokoyama |
| 2008/0062883 | A1 | 3/2008 | Shima |
| 2008/0137133 | A1* | 6/2008 | Trappe ..................... 358/1.15 |
| 2009/0009802 | A1 | 1/2009 | Shaw et al. |
| 2009/0027700 | A1 | 1/2009 | Kim et al. |
| 2009/0037403 | A1* | 2/2009 | Joy et al. .................... 707/5 |
| 2009/0172143 | A1 | 7/2009 | Ishimoto |
| 2009/0219570 | A1 | 9/2009 | Fujisawa |
| 2009/0248632 | A1 | 10/2009 | Subramanian |
| 2009/0273810 | A1 | 11/2009 | Gupta et al. |
| 2010/0020349 | A1 | 1/2010 | Carroll |
| 2010/0309510 | A1 | 12/2010 | Hansen |
| 2010/0328707 | A1 | 12/2010 | Miyake |
| 2011/0007347 | A1 | 1/2011 | Kamath et al. |
| 2011/0013219 | A1 | 1/2011 | Nuggehalli et al. |
| 2011/0063668 | A1 | 3/2011 | Shirai |
| 2011/0096354 | A1* | 4/2011 | Liu ........................... 358/1.15 |
| 2011/0145351 | A1 | 6/2011 | Lee et al. |
| 2011/0231473 | A1 | 9/2011 | Narayanan et al. |
| 2012/0057204 | A1 | 3/2012 | Mizoguchi et al. |
| 2012/0102413 | A1 | 4/2012 | Gnanamoorthy |
| 2012/0206765 | A1 | 8/2012 | Nakajo |
| 2012/0250074 | A1 | 10/2012 | Kamppari et al. |
| 2012/0250076 | A1 | 10/2012 | Kumar et al. |
| 2012/0272339 | A1 | 10/2012 | Kumaravel et al. |
| 2012/0307298 | A1 | 12/2012 | Ishige et al. |
| 2013/0107312 | A1 | 5/2013 | Venkatesh |
| 2013/0182281 | A1 | 7/2013 | Suzuki |
| 2013/0222827 | A1 | 8/2013 | Watanabe |
| 2013/0229680 | A1 | 9/2013 | Kitada et al. |
| 2013/0308165 | A1 | 11/2013 | Venkatesh et al. |
| 2013/0321855 | A1 | 12/2013 | Bhatia |

FOREIGN PATENT DOCUMENTS

| | | |
|---|---|---|
| CN | 101520829 A | 9/2009 |
| EP | 2413234 A2 | 2/2012 |
| JP | 2007133817 A | 5/2007 |
| KR | 20060109699 | 6/2007 |
| WO | WO-0041064 A1 | 7/2000 |
| WO | WO-2012112159 A1 | 8/2012 |
| WO | WO-2012147089 A1 | 11/2012 |

OTHER PUBLICATIONS

Wikipedia, "HP ePrint," Oct 16, 2011, found at <https://web.archive.org/web/20111016081246/http://en.wikipedia.org/wiki/HP_ePrint>.

Wikipedia, "Posterous," Dec. 10, 2010, 3 pages, found at http://en.wikipedia.org/w/index.php?title=Posterous&oldid=401625056.

International Search Report & Written Opinion received in PCT Application No. PCT/US2014/014187, Mar. 5, 2015, 10 pages.

Aranda, D.M., "Architectures for Cloud Providers Federation—Authorization of Diffusion," (Research Paper), Sep. 2011, http://eprints.ucm.es/13513/1/DanielMolina__master.pdf.

Equitrac, "Rules & Routing," 2010, 2 pages found at http://www.equitrac.com/downloads/5379-Rules-Routing_7-10.pdf.

Experts Exchange, "Setting up multiple printers using same IP address with different ports," Apr. 29, 2010, http://www.experts-exchange.com/OS/Microsoft_Operating_Systems/Server/2003_Server/Q_26107790.html.

Extended European Search Report received in EP Application No. 11864184, Sep. 8, 2014, 9 pages.

Google, "Printing Overview," (Web Page), 3 pages, 2012, found at http://support.google.com/chromeos/a/bin/answer.py?hl=en&topic=1329532&p=mkt_enterprise&answer=1329533.

Hewlett-Packard Company, "Print where business happens," (Research Paper), Jul. 5, 2012.

Hewlett-Packard Development Company, L.P., "Cloud printing in the enterprise: Liberating the mobile print experience from cables, operating systems and physical boundaries," (Executive Summary), Mar. 2010.

Hewlett-Packard Development Company, L.P., "HP Universal Print Driver," Solution and Feature Guide, 2009, 24 pp., http://h20331.www2.hp.com/Hpsub/downloads/UPD5_guide_final%20web.pdf.

International Preliminary Report on Patentability received in PCT Application No. PCT/IN2011/000423, Nov. 7, 2013, 6 pages.

International Preliminary Report on Patentability received in PCT Application No. PCT/US2011/025293, Aug. 29, 2013, 6 pages.

International Search Report & Written Opinion received for PCT Application No. PCT/IN2011/000423, Feb. 9, 2012, 11 pages.

International Search Report & Written Opinion received for PCT Application No. PCT/IN2011/025293, Sep. 29, 2011, 9 pages.

Namtuk, "Automatic Print Email," (Web Page), 2011, found at http://www.automatic-print-email.com/.

Printech, "Intelligent Print Job Routing," (Web Page), 2009, found at http://www.printech.com/intelligent_print_job_routing.htm.

Ricoh, "doc-Q-manager, The Enterprise-wide Network Solution for Effective Print Job Management," Printing Solutions for Aficio Series, available Oct. 3, 2006 at http://ricoh-photocopiers.co.uk/Print_Management/DocQManagerBro.

Schwartz, J. et al., "IBM Launches Enterprise Cloud Services," Jun. 16, 2009, 3 pages.

Silveria, L., "Itinerary not displaying in account," TripIt Help Center, Nov. 9, 2009, 2 pages, found at https://tripit.zendesk.com/entries/77324-Itinerary-not-displaying-in-account.

Trapani, G., "TripIt Organizes Your Travel Itinerary Automatically via Email," Lifehacker, Sep. 18, 2007, 3 pages, found at http://lifehacker.com/300833/tripit-organizes-your-travel-itinerary-aut.

Wikipedia, "HP ePrint," Oct. 16, 2011, found at <http://web.archive.org/web/20111016081246/http://en.wikipedia.org/wiki/HP_ePrint>.

Wikipedia, "Posterous," Dec. 10, 2010, 3 pages, found at http://en.wikipedia.org/w/index.php!title=Posterous&oldid=401625056.

Wolber, A., "Print anywhere: Chrome, Google Apps and Cloud Print," (Web Page), Oct. 9, 2012, found at http://www.techrepublic.com/blog/google-in-the-enterprise/print-anywhere-chrome-google-apps-and-cloud-print/.

Xerox®, "Xerox® Mobile Print," (Web Page), 2011, found at http://www.office.xerox.com/software-solutions/xerox-mobile-print-solution/enus.html.

* cited by examiner

USING A GENERIC EMAIL ADDRESS OF A SERVER AND A SENDER EMAIL ADDRESS TO DETERMINE A DESTINATION PRINTER FOR PRINT DATA

RELATED APPLICATIONS

This application is a Continuation of U.S. patent application Ser. No. 13/077,183, entitled "METHODS AND SYSTEMS FOR FULFILLMENT OF A PRINT REQUEST," filed Mar. 31, 2011, the aforementioned application being hereby incorporated by reference in its entirety.

BACKGROUND

A printer can be attached directly to a computing device or it may be connected to a computing device over a network. In the case of a printer connection over a network, a user can submit print jobs from the computing device to the printer over the network. To submit a print job to a network printer, a printer driver is typically installed on the user computing device. In the case of multiple available network printers, the user typically needs to know something about the available network printers (e.g., location, availability, capabilities, etc.) to select a printer best suited for handling a particular print job.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

HP ePrint technology, available from the Hewlett-Packard Company of Palo Alto, Calif., enables assignment of an email address to a printer and allows a user to print with the printer by sending an email to the printer's email address. The email address assigned to the printer may be a complex randomly generated sequence of letters and numbers. While such an email address is beneficial from a security standpoint (e.g., prevents spamming the printer), it may be very difficult for users to remember.

Various embodiments described herein allow users to send a print job via email to a generic email address (e.g., one that is easy to remember). The print job is then redirected to an email-enabled printer based, in part, on the sender's email address. Because print jobs are directed to printers based on the sender's email address, multiple users can use the same generic address and have their print requests sent to different printers. In alternate embodiments, users can send print jobs via social media platforms such as Facebook (Facebook, Inc. of Palo Alto, Calif.) and Twitter (Twitter, Inc. of San Francisco, Calif.). Further explanations and examples are provided herein.

Figure 1:
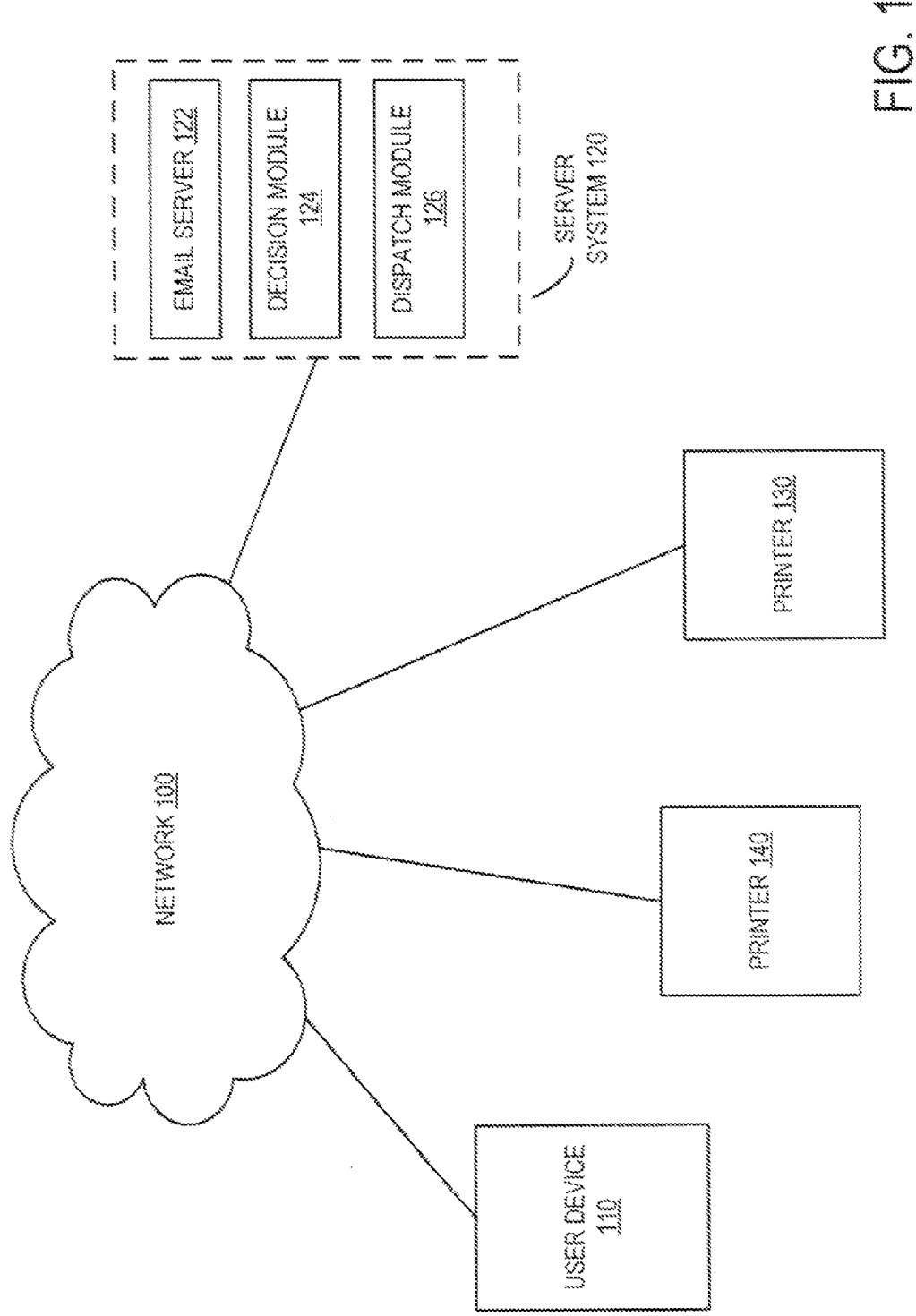
FIG. 1 is a block diagram illustrating a system according to various embodiments.

FIG. 1 is a block diagram illustrating a server system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

In FIG. 1, server system 120 enables a user to email a print job from user device 110 to a printer (e.g., printer 130) over one or more communications networks, such as a local area network (LAN) and/or wide area network (WAN). In one example, network 100 includes the Internet or other mobile communications network (e.g., 3G or 4G mobile device network).

Server system 120 includes an email server 122, a decision module 124 and a dispatch module 126. As illustrated by the dotted line in FIG. 1, the components of server system 120 may be combined into a single physical server device or they may be distributed among multiple server devices, such as, for example, in a cloud computing infrastructure.

Email server 122 receives an email from user device 110. User device 110 can be any computing device capable of sending an email including, but not limited to, desktop computers, notebooks, smartphones, tablet computers, television sets, and other "smart" devices. In various embodiments, email server 122 is dedicated to handling print requests, so all emails received by email server 122 are assumed to be print requests. Decision module 124 selects a printer to fulfill the print request based on the sender's email address and a printer characteristic. For example, a user, Bob, has previously registered his email address (e.g., bob@xyz.com) with printer 130 (and only printer 130 in this example). The registration is maintained by server system 120. Thus, when email server 122 receives an email from bob@xyz.com, decision module 124 selects printer 130 to fulfill the print request based on Bob's email address being registered to printer 130 (and only printer 130).

In the example above, note that decision module 124 selects printer 130 based on the sender email address (e.g., bob@xyz.com) as opposed to the destination address. An email address, as used herein, is a string of characters separated into two parts by an "@"—the "local part" comes before the "@" and the domain comes after the "@" (i.e., local-part@domain). So, for example, email server 122 might be associated with the domain "hpeprint.com" and printer 130 might have the email address 23sf7yudf7kt@hpeprint.com. However, in various embodiments, if printer 130 is the only printer with which Bob has registered his email address, Bob could send an email (e.g., with an attachment to be printed) to a generic email address such as, for example, myprinter@hpeprint.com and decision module 124 would select printer 130 based on Bob's email address being registered with printer 130. Under such a scenario, a different user, Jan, who has registered her email address (ian@awesomemail.com) with printer 140 could also send an print request to myprinter@hpeprint.com and decision module 124 would match her email address with printer 140 and thus select printer 140 to fulfill the print request. Any generic destination address could be used to send a print request as long as the appropriate domain for the server system (e.g., server system 120) is used in the destination address.

Dispatch module 126 dispatches the print request to the selected printer. The data to be printed may be included in the body of the email, as an attachment to the email, or referenced via a URI (Uniform Resource Identifier). For example, an email print request might include embedded text, images, or a document, photo, image, spreadsheet, or other suitable attachment. Accordingly, dispatch module 126 includes the data to be printed (e.g., text, document, and/or image, etc.) when dispatching the print request to the selected printer.

Figure 2:
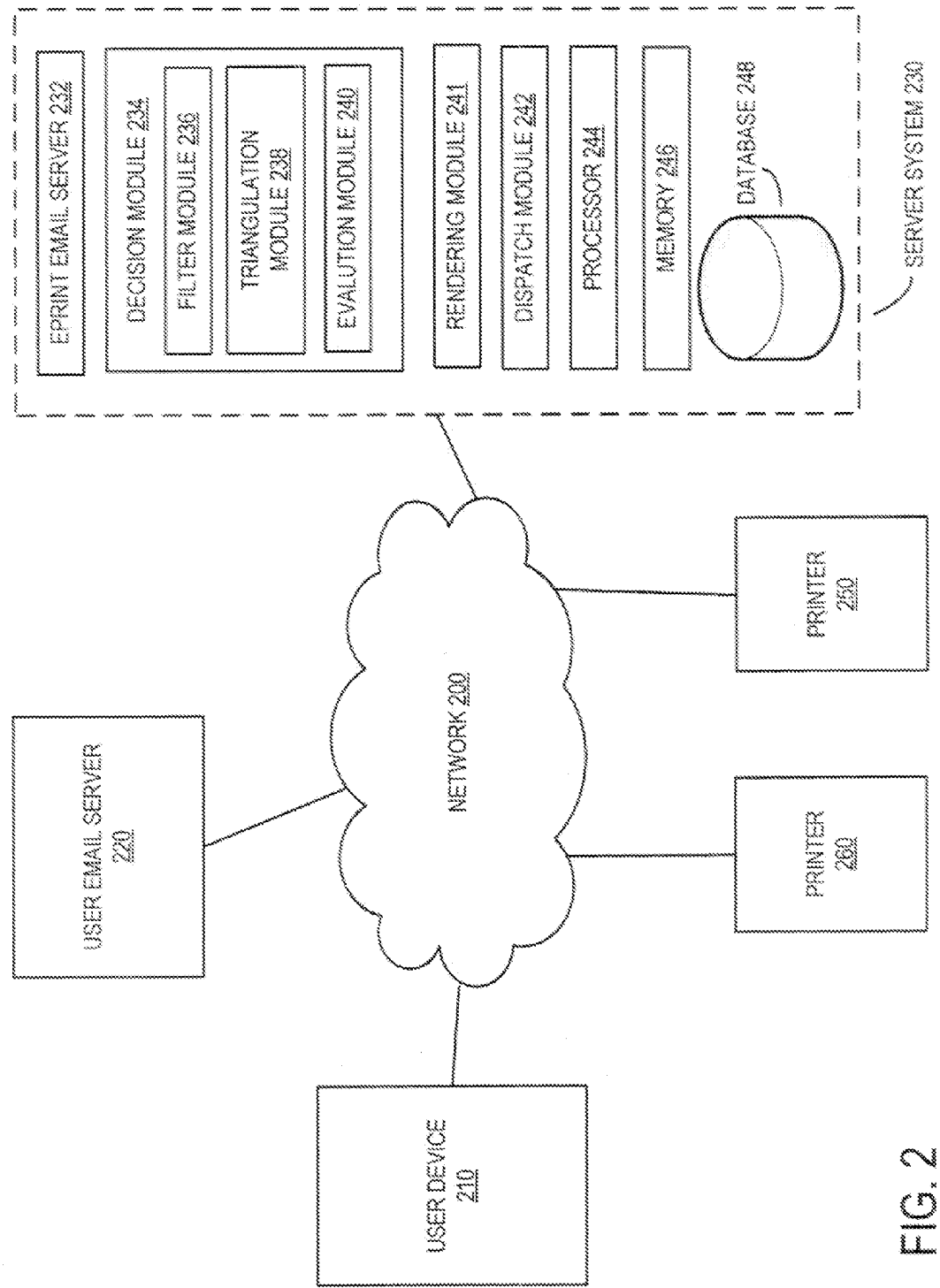
FIG. 2 is a block diagram illustrating a system according to various embodiments.

FIG. 2 is a block diagram illustrating a server system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

In FIG. 2, server system 230 enables a user to email a print job from user device 210 to a printer (e.g., printer 250,260) over one or more communications networks, such as a local area network (LAN) and/or wide area network (WAN). In one example, network 200 includes the Internet or other mobile communications network (e.g., 3G or 4G mobile device network). As illustrated by the dotted line in FIG. 2, the components of server system 230 may be combined into a single physical server device or they may be distributed among multiple server devices, such as, for example, in a cloud computing infrastructure.

User device 210 can be any computing device capable of sending an email including, but not limited to, desktop computers, notebooks, smartphones, tablet computers, and the like. When a user of device 210 desires to print something (e.g., a document, image, etc.), the user initiates a print request by sending an email to an email-enabled printer. The email is sent from the user's outgoing mail server 220 to the email server 232 of server system 230. In various embodiments, email server 232 is dedicated to handling print requests, so all emails received by email server 232 are assumed to be print requests. However, in alternate embodiments, email server 232 might also receive emails not related to print requests. In such embodiments, email server 122 might include a filter to distinguish print requests from other emails, for example, based on the destination domain.

Decision module 234 selects a printer to fulfill the print request based on the sender's email address and a printer characteristic. Server system 230 maintains a list of printer associations in database 248. In other words, database 248 maintains a mapping of email addresses and the email-enabled printers to which those email addresses have been registered and/or whitelisted. An email address may be mapped to one printer or many printers. Database 248 also maintains information about email-enabled printers affiliated with server system 230 that are open or semi-open. In other words, some email-enabled printers might not be restricted to use only by registered email addresses or email addresses on a printer whitelist. Thus, these printers might be available to a user even if the user's email address has no previous association with the printer.

In one example, decision module 234 selects a printer to fulfill the print request based on the sender's email address and the geo-location of the printer. Though not necessary, the printer selection might be further based on the destination address of the print request. For example, server system 230 might recognize a generic email address, such as nearest@hpeprint.com, for requesting a print job based on a user's proximity to various email-enabled printers affiliated with server system 230.

Database 248 maintains geo-location information for email-enabled printers affiliated with server system 230. Filter module 236 filters the list of printers in database 248 to include only those printers that are available to a user based on the user's email address. So, for example, if server system 230 is handling a request from user Bob (e.g., sent to nearest@hpeprint.com), filter module 236 would filter the list of printers to include only the printers available to Bob based on his email address (bob@xyz.com). As discussed previously, this list might include printers to which Bob is registered as well as open or semi-open printers to which bob@xyz.com is not blacklisted.

Proximity module 238 determines (e.g., via triangulation) the printer nearest to Bob from the filtered list based on the stored geo-location information for the printers as well as geo-location information for Bob (which, in the static case, could be stored with his email address in database 248 or, in the case of dynamic location due to use of a mobile device, could be embedded in the print request). In this example, if the filtered list of printers includes printer 250 and printer 260, proximity module 238 determines that printer 260 is nearest to Bob (who is using user device 210). Based on this information, decision module 234 selects printer 260 to fulfill the print request from Bob. In various embodiments, email server 232 sends Bob a response email identifying printer 260 as the printer handling the print request.

In a different example, decision module 234 selects a printer to fulfill the print request based on the sender's email address and a printer capability necessary to fulfill the print request. When a print request is received, evaluation module 240 evaluates the data to be printed from the print request to determine the printer capabilities needed to fulfill the print request. For example, the data to be printed might be in color, thereby dictating the need for a color printer. Alternatively, evaluation module 240 might determine that the size of the requested print job is large and requires a printer with sufficient ink and/or toner to complete the job. Other printer needed capabilities, requirements and/or statuses could be determined via evaluation as well (e.g., automatic 2-sided printing, paper size in the paper tray, etc.).

In view of the printer capability needed to fulfill the request, decision module 234 selects an available printer (where availability is again determined by filter module 238 based on the sender email address) that meets the printer capability criteria from the evaluation. In various embodiments, email server 232 may notify the user of the printer selection.

In yet another example, decision module 234 selects a printer to fulfill the print request based on the sender's email address, the destination email address and the printer identity. In this example, decision module 234 compares the list of printer identities associated (e.g., registered, whitelisted, etc.) with the sender email address (e.g., via registration, whitelist. etc.) against the local-part of the destination address to discern the intended printer destination.

One way to discern the intended printer destination is to perform a string-analysis operation comparing the local-part of the destination address against the printer identities. In such cases, the printer identity that most closely matches the local-part of the address is selected. This "fuzzy" string-matching operation does not require a perfect character-for-character match. For example, if user Bob intended to send a print request email to printer250@hpeprint.com but he accidentally misspelled the destination address (e.g., printer250@hpeprint.com), decision module 234 might determine, based on string analysis, that Bob intended to send the email to printer250@hpeprint.com and select printer 250 to fulfill the print request. In other words, decision module 234 leverages known printer associations (between sender email address and email-enabled printers), to select the intended printer even if the destination address is misspelled.

The string analysis described herein can be expanded to include contextual analysis. For example, if user Bob owns a home printer and a work printer, he might register his email address with server system 230 to associate it with both printers. As the owner, he might name his work printer "bobworkprinter" and his home printer "bobhomeprinter" and these identities are stored, for example, in database 248. Accordingly, the destination email address for his work printer might be bobworkprinter@hpeprint.com. In various embodiments, decision module 234 deciphers destination intent by context in view of the printers associated with the sender email address. So, in the example above, assuming user Bob had only his work and home printers associated with his email address, he might send an email to bobofficeprinter@hpeprint.com and decision module 234 might determine from the word "office" in the local-part of the destination address that Bob's intent is to send the request to his work printer as opposed to his home printer based on the context that "office" is more likely associated with work than home.

In each of the examples above, server system 230 may cause email server 232 to send a clarification email to the sender of the print request. The clarification email might inform the user of which printer has been selected to fulfill the request. However, the clarification email might also include a selectable list of multiple printers that satisfy the criteria for the print request (e.g., available printers within a certain distance, printers that have certain capabilities, etc.). Each printer on the list could include a hyperlink for selecting the printer. By selecting one of the printers on this list (e.g., via hyperlink), the printer selection is sent to server system 230 via email reply or by other suitable communications protocol. Decision module 234 then proceeds with the user's selection for fulfilling the print request.

Dispatch module 242 receives an indication of the selected printer from decision module 234 and dispatches the print request to the selected printer. The data to be printed may have been included in the body of the email or as an attachment to the email. For example, an email print request might include a document, photo, image, spreadsheet, or other suitable attachment. Accordingly, dispatch module 126 includes the data to be printed (e.g., text, document, and/or image, etc.) when dispatching the print request to the selected printer.

Server system 230 might also include a rendering module 241 or other suitable module to render and/or format the print data before sending it to printer.

Various modules and/or components illustrated in FIG. 2 may be implemented as a computer-readable storage medium containing instructions executed by a processor (e.g., processor 244) and stored in a memory (e.g., memory 246).

Figure 3:
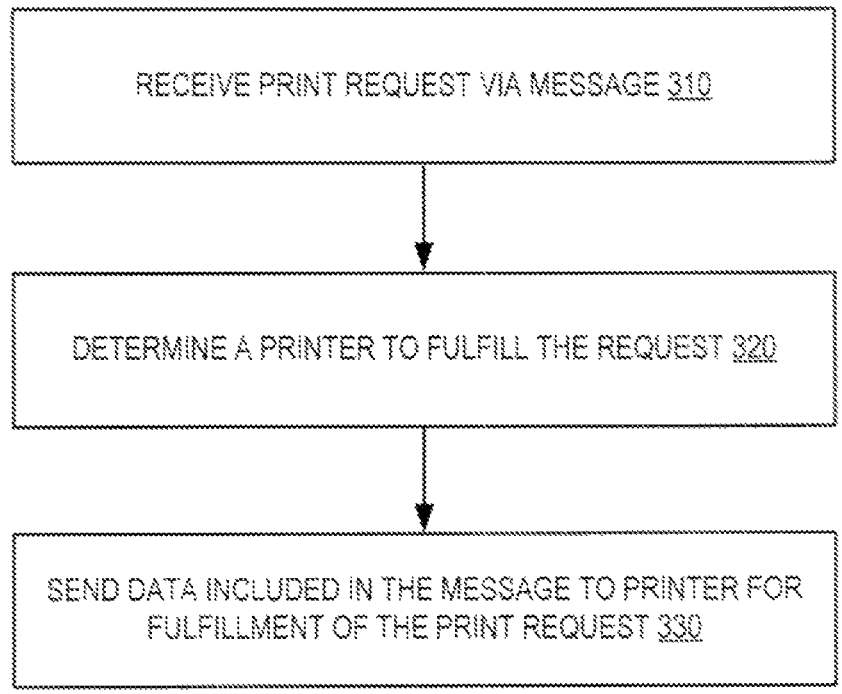
FIG. 3 is a flow diagram of operation in a system according to various embodiments.

FIG. 3 is a flow diagram of operation in a server system according to various embodiments. FIG. 3 includes particular operations and execution order according to certain embodiments. However, in different embodiments, other operations, omitting one or more of the depicted operations, and/or proceeding in other orders of execution may also be used according to teachings described herein.

A server system receives 310 an electronic message from a sender. The electronic message may be an email message, a social media message (e.g., Facebook message, Twitter message or "tweet", Instant Messenger message, etc.), or other user-generated electronic message. The destination address of the message is indicative of a print request. The destination address can be an email address, a user mailbox (e.g., Facebook mailbox), a user account "handle" (e.g., a Twitter username), or other suitable destination. For example, if the message is an email message, the domain part of the destination email address may be indicative of a print request. The email message includes data to be printed. For example, the data might be included in the body of the email (e.g., as text, images, etc.) or the data might be included as an attachment to the email. In another example, a printer tied the server system might have its own Twitter account. Thus, sending a message or "tweet" to the printer's Twitter account may be indicative of a print request.

The server system determines 320 a printer to fulfill the print request based at least on the sender's address and a printer characteristic. For example, the server system might maintain a list of printer associations including those associated with the sender's email address. From the list of printers associated with the sender's email address, one or more printer characteristics might be used to determine the appropriate printer to fulfill the request. Examples of printer characteristics might include printer location, printer identity, printer capabilities, etc.

Upon selection of a printer, the server system sends 330 the data to be printed to the selected printer for fulfillment of the print request.

Figure 4:
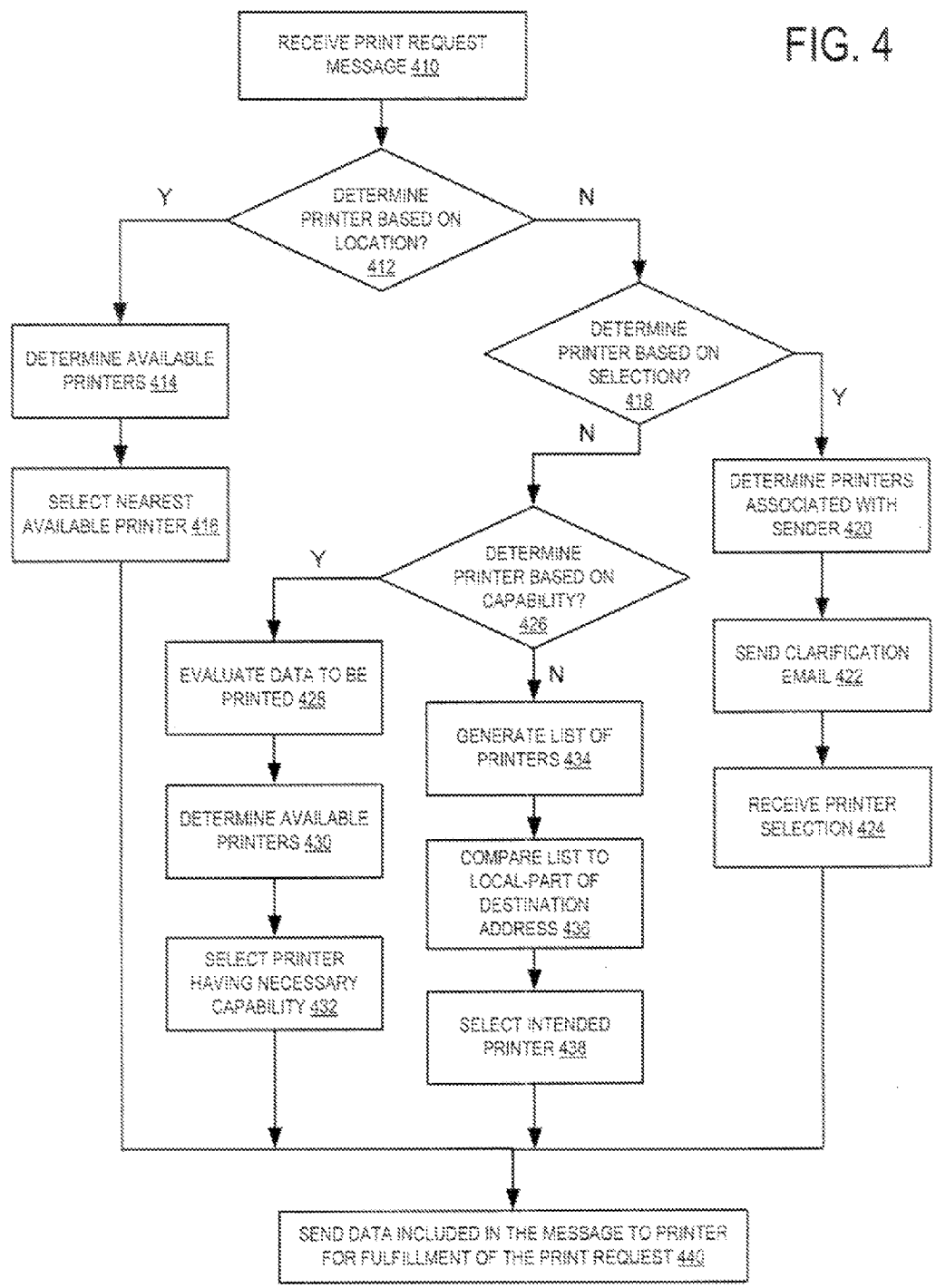
FIG. 4 is a flow diagram of operation in a system according to various embodiments.

FIG. 4 is a flow diagram of operation in a server system according to various embodiments. FIG. 4 includes particular operations and execution order according to certain embodiments. However, in different embodiments, other operations, omitting one or more of the depicted operations, and/or proceeding in other orders of execution may also be used according to teachings described herein.

A server system receives 410 a print request message (e.g., via email, Twitter, Facebook, etc.) from a user. The server system may be distributed, for example, across a cloud computing infrastructure. The server system may determine 412 a printer for fulfilling the print request based on geographic location. For example, in the case of an email message, the destination email address in the print request may specify a preference for the nearest available printer (e.g., nearest@hpeprint.com). In such cases, the server system determines 414 the printers available to the sender of the print request based on the sender's email address. Available printers might include printers that have registered the sender's email address printers that include the sender's email address on a whitelist, and/or printers that are open or semi-open to any user not specifically blacklisted. Based on the available printers, the server system selects 416 the nearest available printer using geo-location information for the printers and the user.

Alternatively, the server system might determine 418 a printer to fulfill the print request based on a user selection. For example, upon receiving the email print request, the server system might determine 420 a list of printers that have an association with the sender (i.e., user) email address (e.g., via registration or whitelist). The server system sends a clarification email back to the sender of the print request with the list of printers associated with the sender. In various embodiments, the user can select a printer via hyperlink or other suitable mechanism. The user selection may be communicated to the server system via email or some other suitable communications protocol. The server system receives 424 the printer selection and proceeds accordingly.

Another alternative is for the server system to determine 426 a printer to fulfill the print request based on one or more printer capabilities. In such cases, the server system might evaluate 428 the data to be printed from the print request email to determine one or more printer capabilities needed to fulfill the print request. For example, the data to be printed might include a color image, requiring a color printer. Or, the data might be indicative of a particular paper size needed to fulfill the request. The server system determines 430 the printers available to the user and then selects 432 from the available printers a printer that has the capabilities needed to fulfill the print request.

In yet another example, the server system might analyze the destination email address (e.g., the local-part of the address) for the print request to determine an intended printer for fulfilling the print request. In such cases, the server system generates 434 a list of printers associated with the sender (e.g., based on the sender email address) of the print request. The server system then compares 436 the destination email address against the list of printers associated with the sender. The comparison enables the server system to recognize the user's intent in view of misspellings, contextual similarities, etc. For example, if a user is registered with Katherine's printer (e.g., katherineprinter@hpeprint.com), Lisa's printer (e.g., lisaprinter@hpeprint.com), and Jeff's printer (e.g., jeffprinter@hpeprint.com) and sends a print request to katharineprinter@hpeprint.com, the server system might determine that the user's intent was to send the request to Katherine's printer even though the user misspelled Katherine's name in the email address. In another example, a user might own a work printer (e.g., workprinter@hpeprint.com) and a home printer (e.g., homeprinter@hpeprint.com). If the user sent an email print request to houseprinter@hpeprint.com, the server system might determine that the user's intent was to send the request to homeprinter@hpeprint.com given that the "house" is contextually more similar to "home" than it is to "work."

To further facilitate the analyzing discussed above, the server system could store additional information (e.g., tags, metadata, etc.) about a printer beyond associated email addresses, device capabilities and geo-location information. For example, tags might include a product family identifier or model number tag, a registered owner tag, or other user-generated tags such as tag identifying the business or institution housing the printer (e.g., library, coffee shop, etc.). Such tags could be used to further enhance the server system's ability to determine a user's intent when selecting a printer.

In view of the comparison between printers associated with the sender and the local-part of the destination email address, the server system selects 438 a printer representative of the user's intent.

In each of the examples described above, upon selection of a printer, the server system sends 440 the data to be printed from the email print request to the selected printer for fulfillment of the print request.

In the embodiments described above, it should be noted that different users could use the same destination email address to send print requests to different printers. For example, user A and user B might each have their own email-enabled printer registered with the server system. Because the server system selects a printer to fulfill each print request based on the sender email address, user A could send a print request to a generic email address (e.g., myprinter@hpeprint.com) and the server system would route the print request to user A's printer. At the same, if user B sends a print request to the same address (e.g., myprinter@hpeprint.com), the server system would route the print request to user B's printer based on the sender email address.

Various modifications may be made to the disclosed embodiments and implementations of the invention without departing from their scope. Therefore, the illustrations and examples herein should be construed in an illustrative, and not a restrictive sense.

The invention claimed is:

1. A method for selecting a printer to execute a print job, the method performed by one or more processors of a server system and comprising:
    maintaining a list of printer associations between user addresses and a set of network printers;
    receiving a print request from a respective user address of a user, the print request comprising the print job and being directed to a destination email address;
    performing a string analysis operation comparing a local portion of the destination email address against printer identities of the set of network printers; and
    based at least in part on the list of printer associations and the string analysis operation, determining that one or more of the set of network printers is associated with the respective user address.

2. The method of claim 1, further comprising:
    in response to determining that a respective one of the set of network printers is associated with the respective user address, transmit the print job to the respective network printer for execution.

3. The method of claim 1, further comprising:
    in response to determining that a plurality of the set of network printers are associated with the respective user address, generate and transmit a clarification message to enable the user to select one of the plurality of network printers to execute the print job.

4. The method of claim 1, wherein each of the set of network printers is associated with a geo-location, and wherein the print request is embedded with geo-location information of the user.

5. The method of claim 4, further comprising:
    identifying, from the local portion of the destination address, a generic request to transmit the print job to a nearest printer in relation to a location of the user;
    in response to determining that a plurality of the set of network printers are associated with the respective user address, determining a nearest network printer, from the plurality of network printers, based on the embedded geo-location information of the user; and
    transmitting the print job to the nearest network printer.

6. The method of claim 1, wherein the one or more of the set of network printers comprise a home printer and a work printer associated with the respective user address.

7. The method of claim 6, wherein the local portion of the destination email address generically indicates one of the home printer or the work printer, the method further comprising:
    transmitting the print job to the indicated home printer or work printer in the local portion of the destination email address.

8. The method of claim 1, wherein the string analysis operation comprises fuzzy string matching to account for misspellings and select an intended network printer to execute the print job.

9. The method of claim 1, wherein the server system comprises a filter to distinguish emailed print requests from other emails based on a domain portion of the destination email address.

10. The method of claim 1, wherein the respective user address corresponds to a social media platform address associated with the user.

11. The method of claim 1, wherein the print job corresponds to a uniform resource identifier referenced in the print request.

12. The method of claim 1, further comprising:
identifying characteristics of the print job that require a number of printer capabilities to fulfill the print request;
selecting a respective one of the one or more network printers that includes the printer capabilities to fulfill the print request; and
transmitting the print job to the respective network printer for execution.

13. A server system comprising:
one or more processors; and
one or more memory resources storing instructions for selecting a printer to execute a print job, wherein the instructions, when executed by the one or more processors, cause the server system to:
maintain a list of printer associations between user addresses and a set of network printers;
receive a print request from a respective user address, the print request comprising the print job and being directed to a destination email address;
perform a string analysis operation comparing a local portion of the destination email address against printer identities of the set of network printers; and
based at least in part on the list of printer associations and the string analysis operation, determine that one or more of the set of network printers is associated with the respective user address.

14. A non-transitory computer-readable medium storing instructions for selecting a printer to execute a print job, wherein the instructions, when executed by one or more processors of a server system, cause the server system to:
maintain a list of printer associations between user addresses and a set of network printers;
receive a print request from a respective user address, the print request comprising the print job and being directed to a destination email address;
perform a string analysis operation comparing a local portion of the destination email address against printer identities of the set of network printers; and
based at least in part on the list of printer associations and the string analysis operation, determine that one or more of the set of network printers is associated with the respective user address.

* * * * *